Fig. 1.

INVENTOR
RICHARD B. THOMAS and
COLLIER A. ELLIOTT
BY
Lockwood, Woodard, Smith & Weikart
Attorneys

R. B. THOMAS ETAL 3,186,276

SLUG STRIPPING APPARATUS

Filed Jan. 7, 1963

INVENTOR.
RICHARD B. THOMAS and
BY COLLIER A. ELLIOTT

*Lockwood, Woodard, Smith & Weikart*
Attorneys

June 1, 1965  R. B. THOMAS ETAL  3,186,276
SLUG STRIPPING APPARATUS
Filed Jan. 7, 1963  5 Sheets-Sheet 4

INVENTOR.
RICHARD B. THOMAS and
BY COLLIER A. ELLIOTT

Lockwood, Woodard, Smith & Weikart
Attorneys

June 1, 1965  R. B. THOMAS ETAL  3,186,276
SLUG STRIPPING APPARATUS
Filed Jan. 7, 1963  5 Sheets-Sheet 5

INVENTOR.
RICHARD B. THOMAS and
COLLIER A. ELLIOTT
BY
Lockwood, Woodard, Smith & Weikart
Attorneys

3,186,276
SLUG STRIPPING APPARATUS
Richard B. Thomas, 1516 Quarry Road, Marion, Ind., and Collier A. Elliott, 19 Pell Terrace, Garden City, N.Y.
Filed Jan. 7, 1963, Ser. No. 249,956
3 Claims. (Cl. 83—206)

This invention relates generally to the processing of printing slugs produced by conventional slug linecasting machines and in particular to an apparatus for accurately stripping or sizing linecast slugs preparatory to incorporating them into printing type forms.

The apparatus of the present invention is utilized for accurately cutting or stripping from a group of slug linecastings a portion of the cast metal leaving only a plaquette composed of the type face and a small thickness of metal. Groups of stripped castings are then incorporated into type forms in the make-up process for ad printing or the like. Various types of table mounted saws have been used in the past to accomplish the stripping, however, these have lacked accuracy and the speed resulting from automatic operation which are characteristic of the apparatus of the present invention.

The apparatus comprises a table mounting an overhead saw which moves through a cutting path. A multiple station turntable presents the work to the saw at one station, unloads the scrap at another station and permits loading of uncut material at the other stations. As the table indexes into the cutting station, automatically operated positioning plates correctly orient the work to be cut with the path of the saw. An automatically operated clamp then holds the work in proper position while the saw traverses its cutting path. After the cut is made the saw is automatically retracted, the stripped plaquette of type falls through a receiving slot in the table to a conveyor or receptacle, and the turntable indexes again bringing the next uncut group of slugs into cutting position and moving the scrap from the previous cut to the scrap unloading station where it is automatically ejected. As long as the actuating switch is held closed the apparatus continues to cycle.

In indexing or orienting the group of slugs to be stripped with relation to the path of travel of the saw the face of the print is used as the reference surface thereby eliminating slug thickness variation as a factor affecting the accuracy of dimension of the stripped type plaquette. Accuracy of plaquette size must be maintained to a tolerance of approximately .002 inch. The use of an overhead mounting for the rotary saw blade is conducive to the required accuracy since a relatively smaller diameter (hence more rigid) blade may be used. The apparatus incorporates adjustments which permits various thicknesses of material to be stripped from the group of slugs presented to the saw blade.

The primary object of the present invention is to provide an apparatus and accompanying control system for stripping groups of linecast slugs to an automatic sequence with the processed type plaquette being removed and the scrap ejected automatically during the cycle.

A further object of the present invention is to provide an apparatus of the type referred to utilizing a saw mounted for traverse above the work to be cut.

A further object of the present invention is to provide an apparatus of the type referred to having means for automatically positioning and clamping the group of slugs to be cut with relation to the traverse path of the saw with the type face being used as a reference surface.

These and other objects will become apparent as the description proceeds with reference to the accompanying drawings in which.

Figure 1:
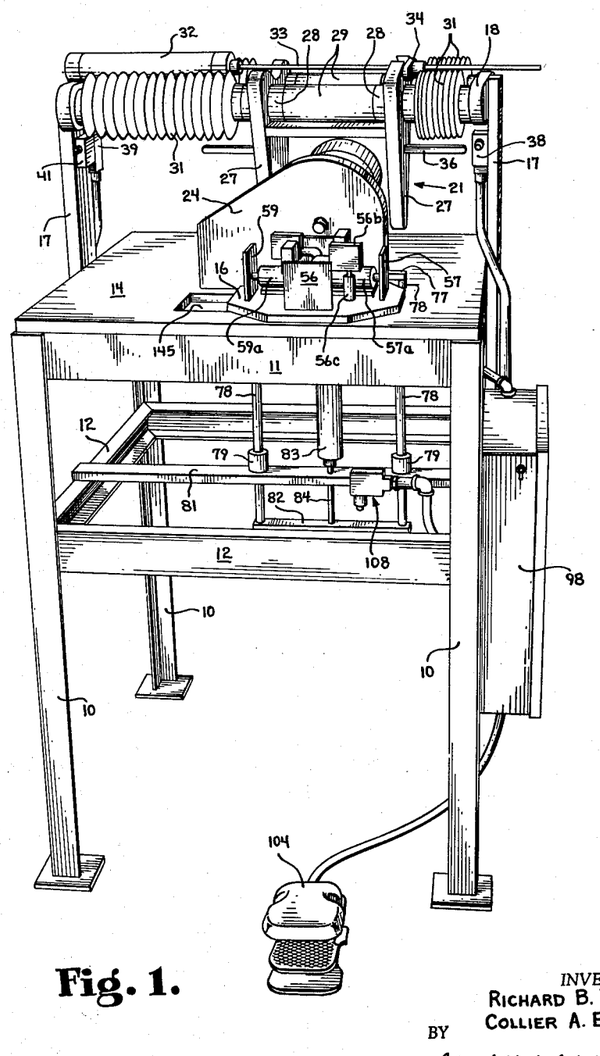
FIG. 1 is a perspective view of an apparatus embodying the present invention.
Figure 2:
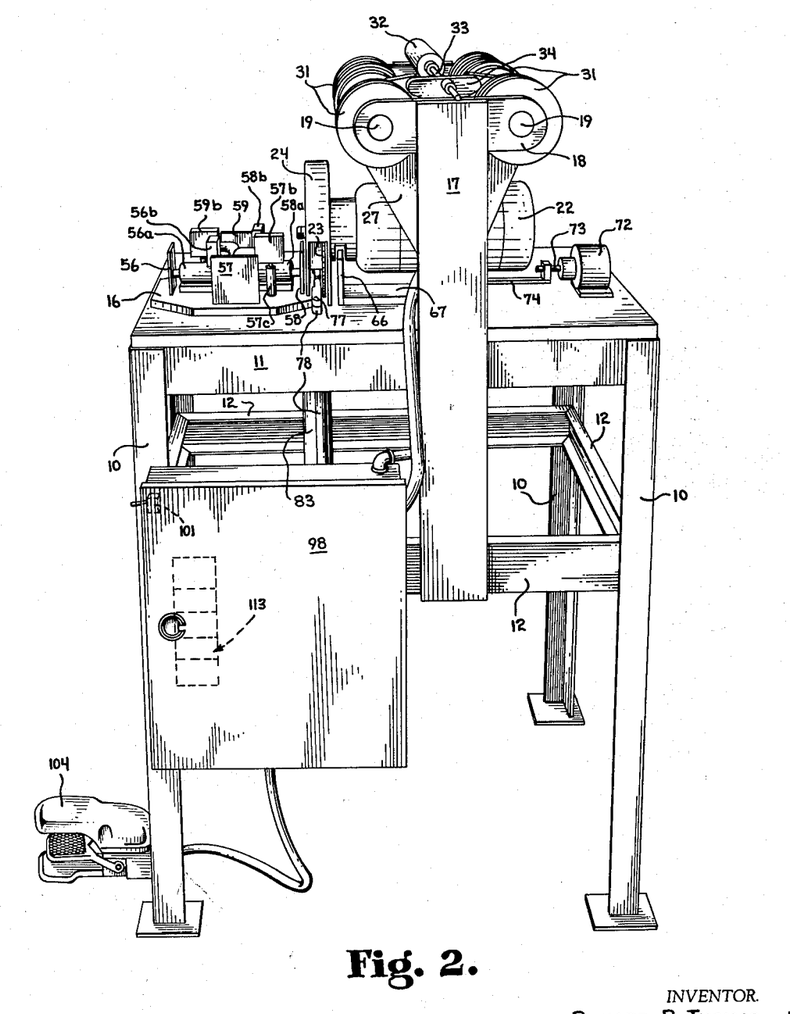
FIG. 2 is also a perspective view of the apparatus but showing the relative location of certain of the control components.

Referring initially to FIGS. 1 and 2, the structure embodying the present invention is supported by means of upright legs 10, upper transverse members 11 and lower transverse members 12, all formed by suitable angle irons welded or otherwise rigidly secured together. A table or support surface 13 is disposed across the top of the frame just described and closely overlying the table 14 is a turntable 16 which is rotatable, as will subsequently be described, counterclockwise (as viewed in FIG. 1) in a plane parallel to the plane of the table.

Supported on the side frame members and extending vertically upwardly therefrom are saw support members 17. Rigidly secured to the upper ends of the vertical members 17 are transverse members 18 supporting stationary shafts 19 extending between the transverse members. Reciprocable along the shafts 19 is a cradle assembly, indicated generally at 21, which supports the electric motor 22 and the rotary saw blade 23 driven thereby. Supported on and movable with the motor and saw blade is a blade enclosing hood 24 which serves to capture chips flying from the saw and to direct them downwardly through the slot 26 (FIG. 1) in the table 14 and thence into a suitable receptacle not shown. The cradle 21 includes the triangularly shaped members 27 which are apertured at their upper ends to receive conventional bearing members 28. Spacer sleeves 29 extends between the bearings. The portions of the shafts 19 extending beyond the cradle 21 are enclosed by bellows-shaped, rubber hoods 31, each of which are fastened at one end to the members 18 and at the other end to the cradle assembly 21. The hoods serve to seal the exposed portions of the shafts 19 from contamination by chips or other material which might inhibit the free motion of the cradle assembly along the shafts.

Supported horizontally between the shafts 19 is a conventional pneumatic power element 32 (FIG. 2) whose thrust rod 33 is adjustably secured to a member 34 attached to the cradle assembly 21. It will be understood that motion of the thrust rod 33 serves to move the cradle assembly 21 and the saw carried thereby through a linear path across the upper surface of the table 14 from an initial position closely adjacent the left-hand one of the upright members 17 (as viewed in FIG. 1), and through a cutting position shown in FIG. 1. Extending in opposite directions from the cradle assembly 21 are actuating arms 36 and 37 (FIG. 1). As the saw completes its travel through the cutting position the member 36 actuates the limit switch 38 whose function will be subsequently described with reference to FIG. 9. As the saw completes its motion into its initial or starting position, the member 37 actuates a further limit switch 39 and a mechanically operated pneumatic control valve 41. The power element 32 is controlled by a solenoid air valve 30, shown schematically in FIG. 9.

Figure 8:
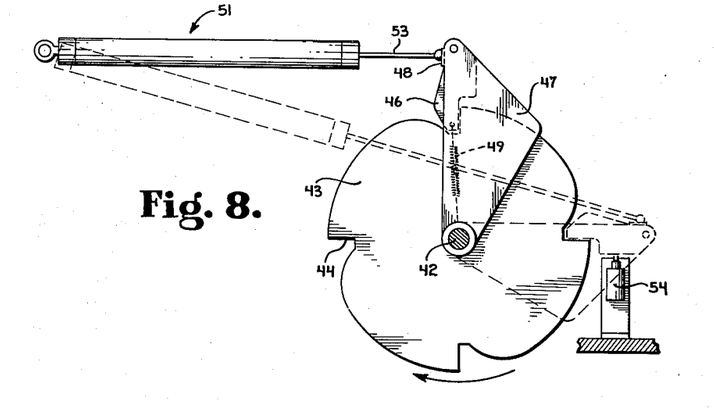
FIG. 8 is a bottom view of the power means for ratcheting or indexing the turntable component.

The means for providing the incremental or indexing motion of the turntable 16 will now be described with reference to FIG. 8. The turntable is rotated about a vertical shaft 42 which extends downwardly through the table 14. Rigidly mounted on the shaft 42 and underlying the table 14 is a cam member 43. The cam is notched as indicated at 44 at equally spaced intervals corresponding to the number of stations provided on the turntable. The notched portions of the cam 43 are successively engaged by the pawl 46 of a ratchet arm 47 which is pivotally movable about the shaft 42. The pawl is conventionally pivoted upon the ratchet arm and is prevented from moving clockwise with relation to the ratchet arm by means of a stop or abutment 48 integral with the arm 47. A tension spring 49 serves to bias the pawl 46 into the position shown in FIG. 8. The motive force for the ratchet arm 47 is supplied by a pneumatically operated power means indicated generally at 51, the power means 51 being controlled by the solenoid air valve indicated schematically at 52 in FIG. 9. From FIG. 8 it will be evident that upon extension of the power means 51, the thrust rod 53 thereof being pivotally connected to the stop member 48, the cam 43, and consequently the turntable 16, will be indexed through discrete angular increments. The ratchet arm 47, as indicated by broken lines in FIG. 8, at the extreme limit of its movement engages and actuates a control means in the form of a mechanically operated pneumatic control valve 54 whose function will be subsequently explained.

Figure 4:
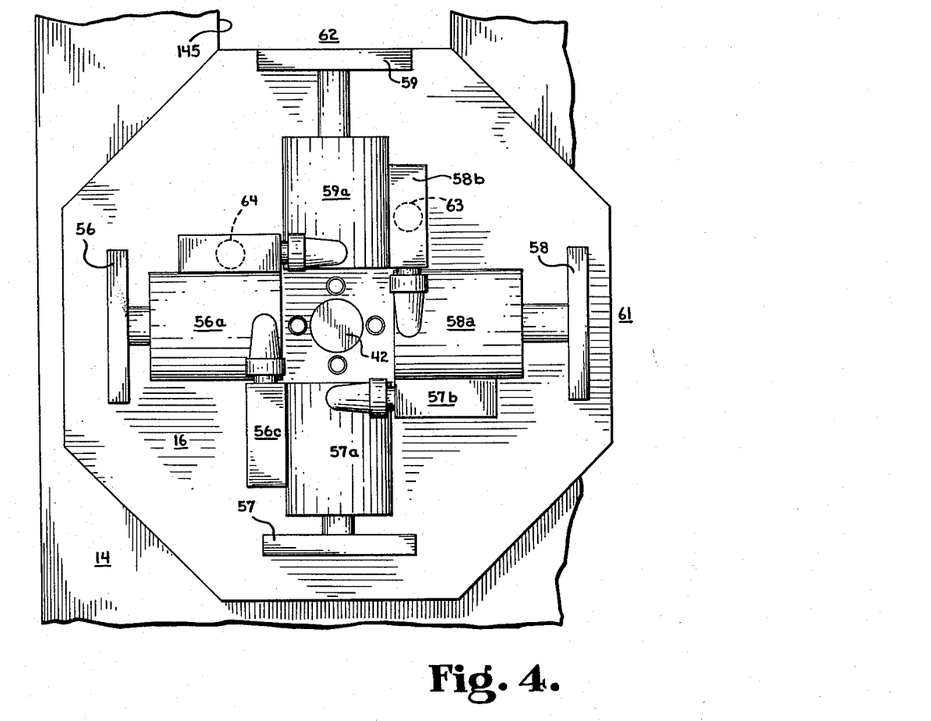
FIG. 4 is a top plan view of the turntable component shown in FIGS. 1–3.
Figure 5:
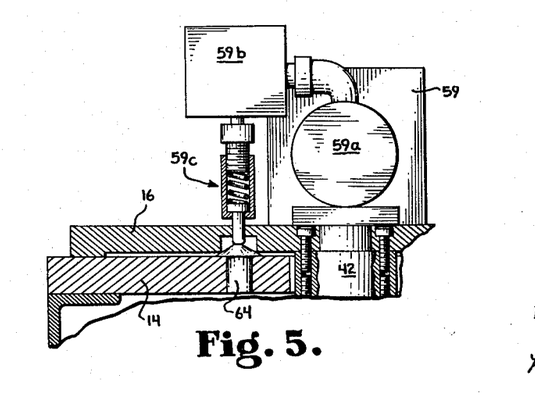
FIG. 5 is a fragmentary sectional view showing a portion of the structure illustrated in FIG. 4.

Referring primarily to FIGS. 1, 2, 4 and 5, the push-up plates and their actuating mechanism carried at each of the stations on the turntable 16 will now be described. Disposed in spaced relationship about the marginal area of the turntable are push-up plates 56, 57, 58 and 59. The push-up plates are each carried on the end of the thrust rods of power means in the form of pneumatically operated cylinders 56a, 57a, 58a and 59a. The motion of the push-up plates produced by the power elements is radial with relation to the turntable axis of rotation, such motion being between a retracted position spaced from the marginal edge of the turntable and an extended position at the turntable margin. In FIG. 4 the push-up plate 59 is illustrated in extended position. Pressurizing of all of the power elements or actuators 56a, 57a, 58a and 59a is controlled by the mechanically actuated valve 54 referred to with reference to FIG. 8, however, to assure that only the pressure plate disposed at the cutting station (indicated at 61 in FIG. 4) and the push-up plate situated at the scrap removal station (indicated at 62 in FIG. 4) are moved to extended position when pressure is applied to the actuators, each actuator 56a, 57a, 58a and 59a is provided with a normally closed valve indicated at 56b, 57b, 58b and 59b. These valves are normally closed but are actuated to open position by means of the spring loaded actuating stem carried by each of the valves. The actuating stem for the valve 59b is shown in detail in FIG. 5 and is there identified as 59c. Each of the valves 56b, 57b, 58b and 59b is provided with a similar actuating stem, the lower end of which extends through an aperture in the turntable 16. With indexing of the turntable so as to bring the push-up plates sequentially into stations 61 and 62, the actuating stems controlling the valve associated with the power units at stations 61 and 62 are actuated by means of cam pins 63 and 64 (only cam pin 64 being visible in FIG. 5). Thus, as each push-up plate is indexed into station 61 and 62 the actuating stem for its corresponding air valve is moved so as to open the valve and to permit the power elements to move the push-up plates to extended position under control of the valve 54 (FIG. 8).

Figures 6, 7:
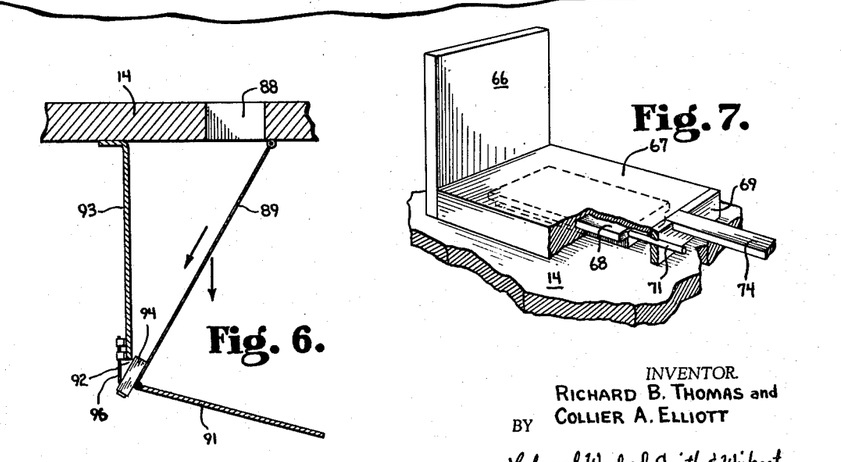
FIG. 6 is a schematic, sectional view of a structure for accommodating the plaquettes of type subsequent to the cutting operation.
FIG. 7 is a fragmentary, perspective view illustrating in detail the mounting for the locating plate which forms a part of the structure shown in FIGS. 1–3.

Co-operating with the push-up plate at the cutting station 61 is a locating plate 66. The locating plate faces the push-up plate at the cutting station but is located on the opposite side therefrom with relation to the path of travel on the saw. As may best be seen in FIG. 7, the locating plate is rigidly attached to one end of a slotted block 67 which encloses, and is capable of limited reciprocal motion with relation to, a T-shaped block 68. The block 68 is rigidly attached to the table 14 and the end of the member 67 opposite the locating plate is closed by means of a cap member 69. A locating screw 71, threaded through the cap member 69 and engaging the adjacent end of the member 68 permits adjustment of the limit of motion of the locating plate toward the saw path of travel. As shown in FIG. 7 the locating plate is in its extended position in which it is closely adjacent the path of travel of the saw but is capable of being moved to a retracted position spaced from the saw. The motive means for this movement of the locating plate 66 is provided by a power means taking the form of a conventional pneumatic actuator 72 (FIG. 2). The thrust member 73 of the actuator is rigidly connected to an extension link 74. The free end of the link 74 is rigidly attached by any suitable means to the cap member 69 as may best be seen in FIG. 7. It will be understood that as the actuator 72 is pressurized the locating plate 66 will be advanced to extended position and will be withdrawn to retracted position when the actuator 72 is de-pressurized. The pressure chamber of the actuator is connected in series with the pressure chambers of the push-up plate actuators and is thus also controlled by the mechanically actuated valve 54 (FIG. 8).

Figure 3:
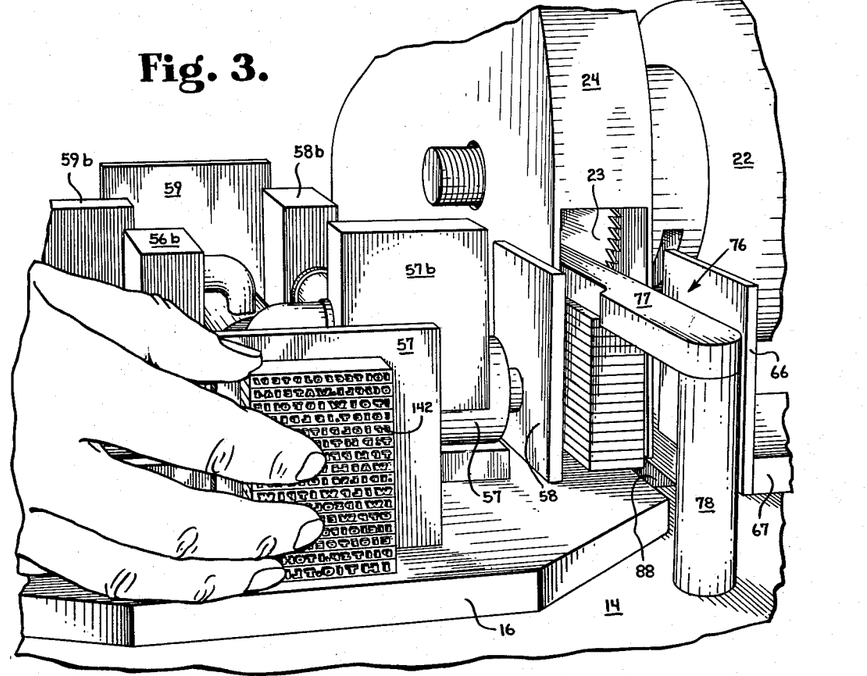
FIG. 3 is an enlarged perspective view illustrating the loading and cutting operation.

Referring to FIGS. 1, 2 and 3, a slug clamping member is indicated generally at 76. The slug clamping member includes a transverse member 77 which is rigidly secured at its ends to vertical rods 78. The rods 78 extend freely through apertures in the table 14 and, beneath the table, into bearings 79 mounted on a transverse member 81 carried by the transverse members 12, this sub-table structure being shown in FIG. 1. A transverse lower member 82 extends between and is rigidly attached to the lower ends of the rods 78. A locating plate power means in the form of the conventional pneumatic power element 83 is also provided, the thrust rod 84 for the power element 83 being attached to the transverse member 82. It will be understood that actuation of and de-actuation of the power element 83 serves to move the clamping member between a clamping position (shown in FIGS. 1, 2 and 3) and a raised position wherein the transverse member 77 is located a substantial distance above the surface of the turntable 16. Normally, if no slug stack member is on the turntable, the transverse member 77 will engage and hold against the upper margin of the appropriate push-up plate. When a slug-stack is positioned in the machine for cutting, the clamping position of the member 77 will be as shown in FIG. 3. The power eelment 83 for the clamping member is controlled by a solenoid air valve 86, illustrated schematically in FIG. 9.

Referring now principally to FIG. 6, the structure for disposing of the type face portions of the slugs after cutting will be described. Directly beneath the portion of the path of travel of the saw within which cutting takes place there is a slot 88 extending through the table 14. The cut type faces fall through this slot and slide along the inclined spaced wires 89, only one of which is visible in FIG. 6. The wires are spaced so that during the travel of the type faces therealong, any chips may fall through, that is between the wires, to be deflected by the inclined plate 91. The cut type faces proceed along the inclined wires and pass out through a slot 92 formed in a generally vertical plate 93. A cut type face is indicated at 94 in FIG. 6 as it passes through the slot 92. Extending into the slot so as to be engaged by the type face as it passes therethrough are spaced electrodes or contact fingers 96. In falling through the slot it will be evident that the electrodes 96 will be bridged thereby closing the switch formed by the electrodes, the switch and the electrical connections therefor being indicated at 96 in FIG. 9.

Figure 9:
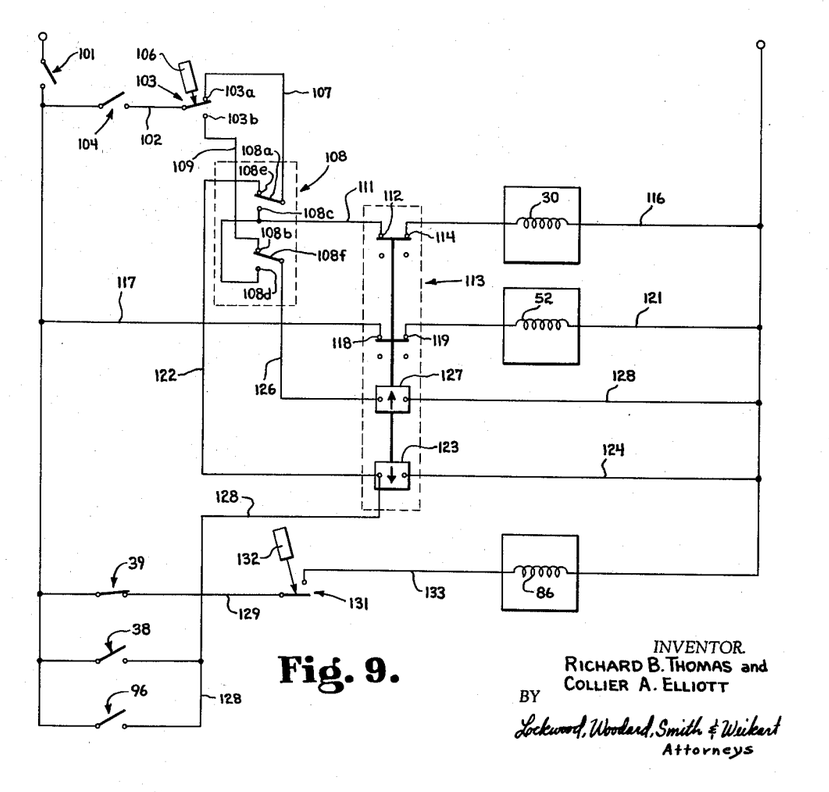
FIG. 9 is a schematic wiring diagram of the electrical control circuit for the apparatus of FIGS. 1–3.

As will be evident from FIGS. 1 and 2 a control housing 98 is supported adjacent the side of the frame and serves to house certain of the control components to be referred to with reference to FIG. 9. Referring to FIG. 9 there are shown the wires L–1 and L–2 across which may be connected, for example a 110 volt A.C. source of electrical power. Interposed in the wire L–1 is an on-off switch 101. A wire 102 connects the line L–1 to one side of a double-throw switch indicated at 103. Interposed in the wire 102 is the foot switch 104. The switch 103 is operated by a small air cylinder indicated schematically at 106 which is actuated when the slug clamping structure 76 is in its raised position. When the slug clamping assembly 76 is in clamping position as shown in FIGS. 1, 2 and 3 the air cylinder 106 will be de-actuated and switch 103 will be in the position shown in FIG. 9. A wire 107 connects contact 103a of the switch 103 with the movable switch arm 108a of a double-throw double-pull switch indicated generally at 108. The switch 108 is shown schematically in FIG. 9 and is also identified in FIG. 1. The switch is contacted and actuated by the transverse member 82 of the clamp assembly, the switch being shown in FIG. 9 in the position it assumes when the transverse member 82 is in contact with the actuating member of the switch 108. Thus when the clamp is in raised position, and for a short distance in its travel away from raised position, the switch 108 is held in the position shown in FIG. 9. A wire 109 connects the contact 103b of switch 103 to the contact 108b of switch 108. Contacts 108c and 108d of the switch 108 are connected together by an internal jumper and the contact 108c is connected by means of a wire 111 to a contact 112 of a latching relay indicated generally at 113 in FIGS. 9 and 2. The adjacent contact 114 of the latching relay 113 is connected by means of a wire 116 to the line L–2. The solenoid air valve controlling the saw feeding or actuating power element, identified at 30, is interposed in the wire 116.

A wire 117 connects the line wire L–1 to the contact 118 of the latching relay 113 and the adjacent contact 119 of the latching relay is connected to the line wire L–2 by means of a wire 121, the solenoid air valve 52 controlling the turntable indexing power element being interposed in the wire 121. A wire 122 connects the contact 108e of the switch 108 with one energizing coil 123 of the relay 113. The other side of the coil 123 is connected to the line wire L–2 by means of the wire 124. A wire 126 connects the switch 108f of the switch 108 with one side of the relay actuating coil 127, the other side of the relay coil being connected to the line wire L–2 by means of the wire 128.

An alternate circuit to the relay actuating coil 123 is provided by the wire 128 which may be alternatively connected to the line wire L–1 through the switches 38 and 96. A wire 129 in which is interposed the switch 39 is connected to one side of an air cylinder actuated switch 131 which is similar to the switch 103, the switch 131 being operated by an air cylinder actuator indicated schematically at 132 in FIG. 9. The air cylinder 132 is pressured by air bled from the locating plate actuating power means 72 (FIG. 2). That is, as soon as the locating plate power element 72 is exerting full pressure, placing the locating plate 66 in extended position, the air cylinder 132 functions to open the switch 131. Switch 131 is also connected to the wire 133 which is connected to the line wire L–2 with the solenoid air valve 86, controlling the clamping bar 77 being interposed therein.

Operation and cycling of the apparatus will now be described with particular reference to FIGS. 3 and 9. In the quiescent position, prior to the starting of the apparatus, the control components will be in the position shown in FIG. 9. The saw will be in its initial position (to the left of the cutting area as viewed in FIG. 1), the turntable 16 will be stationary, the locating plate power means 72 will be in extended position placing the locating plate 66 in extended position, and the clamping member 77, because of the absence of stacked slugs, will be in the engagement with the upper margin of the appropriate push-up plate. The operator places a stack of type or slugs in loading position against the push-up plate 57 which is disposed 90° clockwise from the cutting station 61, as indicated in FIGS. 3 and 4. It will be noted that in loading the type, indicated at 141 in FIG. 3, the type face 142 is disposed outwardly.

After thus loading the apparatus, the operator actuates the foot switch 104 to closed position. As will be evident from FIG. 9, closing of the switch 104 provides an energizing circuit for the latching relay coil 123 through the wire 107, switch contacts 108a, 108e, wire 122 and wire 124. Movement of the latching relay to its down position by energization of the coil 123 de-energizes the solenoid air valve 52 controlling the power means 51 (FIG. 8) causing the power means to be retracted, returning the turntable pawl 47 to its solid line position of FIG. 8. This movement of the pawl 47 away from the mechanically actuated valve 54 of FIG. 8 actuates this valve causing the locating plate power means 72 and the push-up plates 58 and 59 to be moved to retracted positions. This action of the locating plate power means 72 and the push-up plate power means causes the air cylinder actuator 132 to close the switch 131. Closing of the switch 131 energizes the solenoid control air valve 86. Energization of this valve causes the clamping member power means 83 to lift the clamp member 77 into raised position and causes pressurization of the air cylinder actuator 106 so as to move the switch 103 to a position connecting the wire 102 to the contact 103b. This provides an energizing circuit for the matching relay coil 127 through wire 109, contacts 108b and 108f and wires 126 and 128. Since the latching relay coil 123 has been de-energized by shifting of the position of switch 103 the latching relay is moved to an up position wherein the contacts 112 and 114 and 118 and 119 are respectively closed. Closure of contacts 118 and 119 energizes the solenoid air valve 52 actuating the turntable indexing power means 51 (FIG. 8) which through the ratchet arm 47 indexes the turntable 16 counterclockwise as viewed in FIG. 1 so that the push-up plate 57 carrying the type slugs 141 is shifted to the cutting station 61 (FIG. 4). Closure of the contacts 112 and 114 does not thereupon energize the solenoid air valve 30 controlling the motion of the saw because the energizing circuit to valve 30 is broken at the contacts 108a and 108c of the switch 108.

Upon completion of the 90° indexing motion of the turntable the ratchet arm 47 (FIG. 8) actuates the mechanically operated valve 54 causing the push-up plate power means for the push-up plate located at the cutting station 61 to move the push-up plate to extended position and further causes the locating plate power means 72 to move the locating plate 66 to extended position. When the locating plate 66 reaches extended position the air cylinder actuator 132 moves the switch 131 to open position de-energizing the solenoid control valve 86 and thereby causing the clamping member power means 83 to move the clamping member 77 to clamping position against the top of the stacked type slugs. It will be noted that the engagement of the type faces by the locating plate 66 provides a reference position for the type faces and the descent of the clamping member 77 in clamping position holds the type slugs in this reference position after the locating plate and push-up plates have been returned to retracted positions.

As soon as the clamping member power means 3 is exerting full pressure establishing the clamping position of the transverse clamping member 77, the air cylinder actuator 106 is actuated to move the switch 103 back to a position wherein the switch arm is engaged with switch contact 103a, that is, to its "up" position as shown in FIG. 9. The motion of the clamping member into clamping position also causes actuation of the switch 108 to its "down" position as viewed in FIG. 9 wherein the contacts 108a–108c and contacts 108f–108d are closed. This change in position of switch 108 retains an energizing circuit through the coil 127 of the latching relay through wire 102, switch 103, wire 107, switch contacts 108a–108c, switch contacts 108d–108f, wires 126 and 128. Closure of switch contacts 108a and 108c provides an energizing circuit for the solenoid control valve 30 controlling the power means for the saw. This circuit may be traced through wire 102, switch 103, wire 107, switch contacts 108a–108c, wire 111, latching relay contacts 112 and 114 and wire 116. The saw is then moved outwardly through its path of travel and through the cutting position (shown in FIG. 1). As the saw moves through the cutting position, it strips the type faces (to a thickness determined by the position of the locating plate 66) from the type slugs. As the saw leaves its initial position, the mechanically operated valve 41 is closed thereby causing the push-up plate at the work station and the locating plate 66 to move to retracted position. Retraction of the push-up plate and the locating plate causes the air cylinder actuator 132 to close the switch 131 but this action has no effect on the control valve 86 since its circuit is open at the switch 39.

On completion of the cut, the type plaquette (the portion carrying the type face) falls through the slot 88 in the table 14 (FIG. 6) and momentarily closes the switch 96. Closure of the switch 96, as will be evident from FIG. 9, provides an energizing circuit for the latching relay coil 123 moving the latching relay to its "down" position opening the contacts 112–114 and 118–119. If the falling type plaquette does not close the switch 96 the limit switch 38 (FIGS. 1 and 9) is closed by the saw reaching the outer limit of its travel to provide a similar energizing circuit for the latching relay coil 123. Opening of the contacts 112 and 114 of the latching relay 113 de-energizes the solenoid air valve 30 returning the saw to its initial position and opening of the contacts 118–119 de-energizes the control valve 52 causing the ratchet arm 47 to be retracted by the power element 51. Retraction of the ratchet arm 47 permits the mechanical valve 54 (FIG. 8) to close, but no action results because mechanical valve 39 is already closed.

When the saw is returned to its initial position the valve 41 is again opened and the switch 39 is reclosed. Closing of switch 39 completes a circuit energizing the solenoid air valve 86 controlling the action of the clamping member power element 83 causing the transverse clamping member 77 to move to raised position. Movement of the clamping member 77 to raised position actuates the switch 108 to "up" position as viewed in FIG. 9 wherein the contacts 108e–108a and 108b–108f are closed. The movement of the clamping member 77 to raised position also causes the air cylinder actuator 106 to move the switch 103 so as to close the switch arm against the contact 103b. This change in position of the switches 103 and 108 provides an energizing circuit for the latching relay coil 127 causing it to again return to "up" position, as viewed in FIG. 9, closing the contacts 118–119 to energize the solenoid air valve 52 controlling the table indexing power element (FIG. 8). The table is then again indexed through 90° counterclockwise as viewed in FIG. 1 bringing the push-up plate 56 into the cutting station and placing the next push-up plate in the loading position. Assuming that the push-up plate 56 has been loaded with a stacked group of type slugs while previously in the loading position, the cycle will then begin again (assuming that the foot switch 104 is retained in closed position). By this indexing of the turntable the scrap produced by the previous cutting operation will be rotated into the station indicated at 62 in FIG. 4 and upon movement of the push-up plate at the cutting station to extended position during the next cycle the push-up plate adjacent the scrap at station 62 will also be moved to the extended position to force the scrap through an opening 145 in table 14 (FIG. 1). It will thus be evident that by loading the appropriate push-up plate during the cutting action of the saw the apparatus may be operated on a continuous basis with cutting and scrap removal occuring with each cycle or indexing of the turntable. Performance of the operation thus may be accomplished at a rapid rate and the cut, oriented with respect to the type face, may be made within relatively close tolerances of the order of .002 inch. The use of an overhead saw arrangement permits a small diameter of saw blade to be used and thus permitting a more rigid mounting of the saw and further permits the delivery of the type plaquette and the scrap through the table. The operation is thus much safer for the operator and there is no necessity to manually remove the work from an area adjacent the saw blade.

It should be further noted that additional safety features are provided by the circuit arrangement. For example, the saw cannot move from its back or retracted position until the clamping member 77 is in lowered, clamping position and the push-up and locator plates are both retracted. Further, the saw cannot leave its retracted position unless the turntable is completely in the proper detent position as evidenced by a failure to actuate mechanical valve 54 (FIG. 8) and therefore a failure of switch 108 to be actuated to its "down" position to permit energization of operator 30 controlling saw travel.

On power failure other than when the saw is in mid-stroke, the clamping member 77 holds tightly in clamping position, the turntable is held immobile. Should power failure occur in mid-stroke of the saw (or if the operator should de-actuate the footswitch 104 in mid-stroke thereby producing the same effect as power failure), the saw will be pneumatically returned to its back or retracted position and upon the return of power will again advance. It should further be noted that each step in the operating cycle proceeds only after the successful completion of the previous step. If a malfunction prevents lowering of clamping member 77 into clamping position, for example, the switch 108 cannot move to its "down" position and the saw traversing control coil 30 cannot be energized.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. An apparatus for stripping the type face from a group of stacked line cast slugs including: a stationary table; an electric motor driven rotary saw; means for supporting the saw in overlying relation to said table and for movement through a linear path across the table; pneumatic power means for moving the saw through said linear path from an initial position, through a cutting position and return to said initial position; a turntable mounted for rotation in closely overlying relation to said table and adjacent said saw path, a plurality of push-up plates disposed in equally spaced relationship about the marginal area of said turntable and extending vertically upwardly therefrom; said push-up plates each being movable radially with relation to the turntable axis of rotation between a retracted position spaced from the marginal edge of the turntable and an extended position at the turntable margin; a pneumatically operated push-up plate power means for each of said push-up plates adapted to move its respective plate between said positions; turntable power means for indexing said turntable through discrete angular increments to thereby sequentially align each of said push-up plates with said saw path; a locating plate mounted on said table and extending upwardly therefrom, said plate having its working face parallel to said saw path and in opposed relation to the adjacent push-up plate, locating plate pneumatic power means for moving said plate between an extended position closely adjacent said saw path and a retracted position spaced therefrom; a slug clamping member mounted for movement between a clamping position and a raised position, power means for moving said clamping member, the path of movement of said clamping member being generally normal to the plane of said table and disposed between said saw path and the aligned one of said push-up plates; a first pneumatic control means actuated in response to completion of an indexing motion increment of said turntable to actuate said push-up plate power means for said aligned push-up plate and said locating plate power means for movement of said plates into extended position; second pneumatic control means operable in response to movement of said saw out of its said initial position to actuate said last mentioned push-up plate power means and said locating plate power means into retracted position; and electrical control means for actuating said saw moving power means, said turntable power means and said clamping member power means in a sequence such that upon energization of said control means with a group of slugs stacked against the push-up plate to be aligned with said saw path by the next indexing movement of said turntable: (1) said clamp member is moved to raised position and said turntable is indexed to align the slug-loaded push-up plate with said saw path, (2) said locating plate and push-up plate are moved to extended position engaging said stacked slugs and said clamp member is moved to clamping position in engagement with said stacked slugs, (3) said saw begins traversing its path of motion and said push-up and locating plates are moved to retracted position, (4) said saw cuts through the stacked slugs and returns to its said initial position, and (5) said clamp member returns to its said raised position and said turntable is indexed to begin a repetition of the cycle.

2. An apparatus for stripping the type face from a group of stacked line cast slugs including: a stationary table; an electric motor driven rotary saw; means for supporting the saw in overlying relation to said table and for movement through a linear path across the table; power means for moving the saw through said linear path from an initial position, through a cutting position and return to said initial position; a turntable mounted for rotation in closely overlying relation to said table and adjacent said saw path, a plurality of push-up plates disposed in equally spaced relationship about the marginal area of said turntable and extending vertically upwardly therefrom; said push-up plates each being movable radially with relation to the turntable axis of rotation between a retracted position spaced from the marginal edge of the turntable and an extended position at the turntable margin; a push-up plate power means for each of said push-up plates adapted to move its respective plate between said positions; turntable power means for indexing said turntable through discrete angular increments to thereby sequentially align each of said push-up plates with said saw path; a locating plate mounted on said table and extending upwardly therefrom, said plate having its working face parallel to said saw path and in opposed relation to the adjacent push-up plate, locating plate power means for moving said plate between an extended position closely adjacent said saw path and a retracted position spaced therefrom; a slug clamping member mounted for movement between a clamping position and a raised position, power means for moving said clamping member, the path of movement of said clamping member being generally normal to the plane of said table and disposed between said saw path and the aligned one of said push-up plates; a first control means actuated in response to completion of an indexing motion increment of said turntable to actuate said push-up plate power means for said aligned push-up plate and said locating plate power means for movement of said plates into extended position; second control means operable in response to movement of said saw out of its said initial position to actuate said last mentioned push-up plate power means and said locating plate power means into retracted position; and electrical control means for actuating said saw moving power means, said turntable power means and said clamping member power means in a sequence such that upon energization of said control means with a group of slugs stacked against the push-up plate to be aligned with said saw path by the next indexing movement of said turntable: (1) said clamp member is moved to raised position and said turntable is indexed to align the slug-loaded push-up plate with said saw path, (2) said locating plate and push-up plate are moved to extended position engaging said stacked slugs and said clamp member is moved to clamping position in engagement with said stacked slugs, (3) said saw begins traversing its path of motion and said push-up and locating plates are moved to retracted position, (4) said saw cuts through the stacked slugs and returns to its said initial position, and (5) said clamp member returns to its said raised position and said turntable is indexed to begin a repetition of the cycle.

3. An apparatus for stripping the type face from a group of stacked line cast slugs including: a stationary table; an electric motor driven rotary saw; means for supporting the saw in overlying relation to said table and for movement through a linear path across the table; power means for moving the saw through said linear path from an initial position, through a cutting position and return to said initial position; a turntable mounted for rotation in closely overlying relation to said table and adjacent said saw path, a plurality of push-up members disposed in equally spaced relationship about the marginal area of said turntable; said push-up members each being movable radially with relation to the turntable axis of rotation between a retracted position spaced from the marginal edge of the turntable and an extended position at the turntable margin; an operated push-up member power means for each of said push-up members adapted to move its respective member between said positions; turntable power means for indexing said turntable through discrete angular increments to thereby sequentially align each of said push-up members with said saw path; a locating member mounted on said table, said locating member having a portion parallel to said saw path and in opposed relation to the adjacent push-up member, locating member power means for moving said member between and extended position closely adjacent said saw path and a retracted position spaced therefrom; a slug clamping member mounted for movement between a clamping position and a raised position, power means for moving said clamping member, the path of movement of said clamping member being generally normal to the plane of said table and disposed between said saw path and the aligned one of said push-up members; a first control means actuated in response to completion of an indexing motion increment of said turntable to actuate said push-up member power means for said aligned push-up member and said locating member power means for movement of said members into extended position; second control means operable in response to movement of said saw out of its said initial position to actuate said last mentioned push-up member power means and said locating member power means into retracted position; and electrical control means for actuating said saw moving power means, said turntable power means and said clamping member power means in a sequence such that upon energization of said control means with a group of slugs disposed adjacent the push-up member to be aligned with said saw path by the next indexing movement of said turntable: (1) said clamp member is moved to raised position and said turntable is indexed to align the slug-loaded push-up member with said saw path, (2) said locating member and push-up member are moved to extended position engaging said stacked slugs and said clamp member is moved to clamping position in engagement with said stacked slugs, (3) said saw begins traversing its path of motion and said push-up and locating members are moved to retracted position, (4) said saw cuts through the stacked slugs and returns to its said initial position, and (5) said clamp member returns to its said raised position and said turntable is indexed to begin a repetition of the cycle.

References Cited by the Examiner
UNITED STATES PATENTS

| | | | |
|---|---|---|---|
| 456,578 | 7/91 | Long | 83—206 |
| 826,075 | 7/06 | White | 83—267 X |
| 996,327 | 6/11 | Gray et al. | 83—267 X |
| 1,469,733 | 10/23 | Seybold et al. | 83—155 |
| 1,633,996 | 6/27 | Narrow | 83—418 |
| 1,798,017 | 3/31 | Free | 83—206 X |
| 2,165,614 | 7/39 | Cook et al. | 83—206 |

ANDREW R. JUHASZ, *Primary Examiner.*